United States Patent

Hagman

[15] 3,657,816
[45] Apr. 25, 1972

[54] DENTAL RESTORATION APPLIANCE

[72] Inventor: Harry C. Hagman, 3801 West Broadway, Minneapolis, Minn. 55422

[22] Filed: Dec. 28, 1970

[21] Appl. No.: 102,003

[52] U.S. Cl. ..................................................32/13
[51] Int. Cl. ..................................................A61c 5/08
[58] Field of Search..........................32/13, 12, 11, 8, 2

[56] References Cited

UNITED STATES PATENTS

| 976,798 | 11/1910 | Hanscom | 32/13 |
|---|---|---|---|
| 3,004,343 | 10/1961 | Ryden | 32/13 |

*Primary Examiner*—Robert Peshock
*Attorney*—Burd, Braddock & Bartz

[57] ABSTRACT

A dental appliance for holding an artificial porcelain tooth facing while the top portion of the tooth is formed or built up upon. The device includes a matrix, i.e., shank or stem, and a top platform with a porcelain confining ridge or wall. It has means for holding the tooth in stable position during working and is made from a heat destructible material destroyed during fusion of the porcelain.

11 Claims, 11 Drawing Figures

PATENTED APR 25 1972 3,657,816
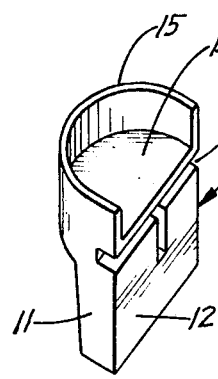
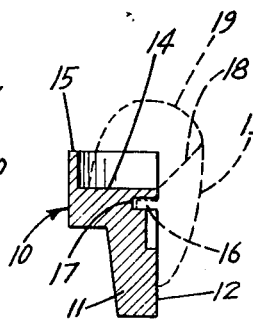
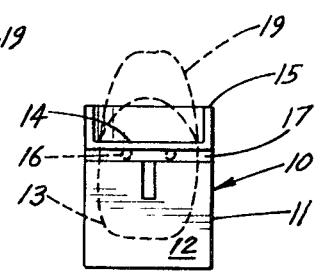
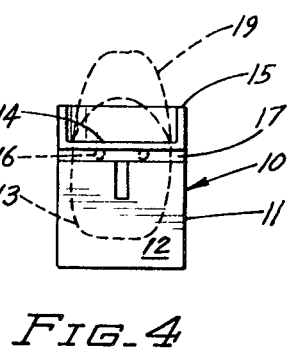
Fig.1  Fig.2  Fig.3  Fig.4
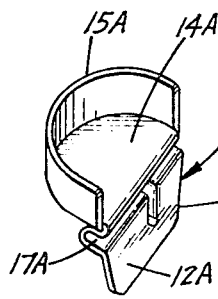
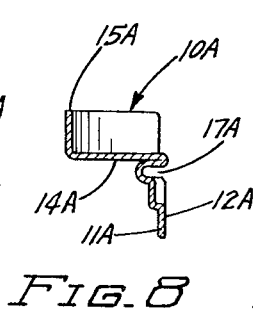
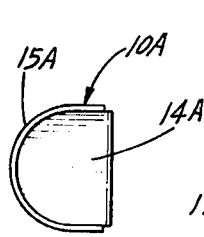
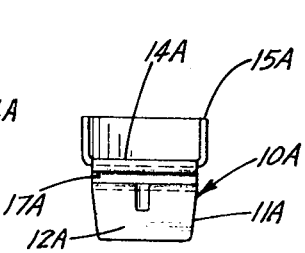
Fig.7  Fig.8  Fig.9  Fig.10
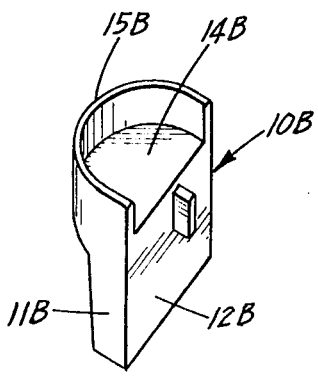
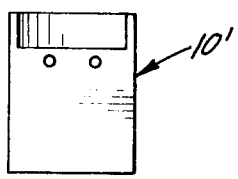
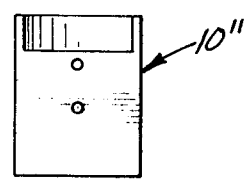
Fig.11  Fig.5  Fig.6
INVENTOR.
HARRY C. HAGMAN
BY
Burd, Braddock & Bartz
ATTORNEYS

DENTAL RESTORATION APPLIANCE This invention relates to a dental appliance for holding an artificial porcelain tooth facing while the top portion of the tooth is formed or built up upon. More particularly, the invention relates to such an appliance formed from material which will melt or evaporate or otherwise be destroyed during the high temperature baking of the artificial tooth.

Porcelain tooth facings are sold as commercial articles and the tops are built up by the dentist or dental technician to fit the tooth cavities or the alveolar ridge of the patient. Such facings are provided with various means by which they can be held, some having pins projecting from the rear flat surface thereof and others being provided with a slot or recess in said surface. A batter of porcelain or porcelain powder is applied to the top of the tooth facing and formed to the appropriate shape to fit the resulting pontic, that is, artificial substitute for a lost tooth, to the jaw of the patient. The built up tooth is then dried and fused in an electric muffle to a "biscuit bake." The biscuited tooth is then tried for fit, built up or ground down to the required contour and fused to a smooth glaze. To complete the facing as a pontic, a wax backing is formed and cast in metal, usually in gold.

The prior art is exemplified by Wells U.S. Pat. No. 1,766,235 wherein there is disclosed a device for use during building up a tooth facing on a metal form on which the built up portion of the tooth is supported during baking, and which usually is left in the tooth. The Wells device provides a handle by which the tooth facing may be held as it is built up. However, it has no means for confining the batter or powder and the facing is removed from the handle before baking. In removing it the facing may be damaged. In using the device of the present invention, the facing need not be disturbed as the entire appliance is placed in the furnace.

It is the principal object of the present invention to provide an appliance for holding a porcelain tooth facing while its top is built up and formed which will provide support for the tooth until it is placed in the muffle and partially baked, at which time the appliance will be destroyed by the heat of the furnace by melting, vaporization, or otherwise.

The invention is illustrated in the accompanying drawings in which:

FIG. 1 is a perspective view of one form of appliance, according to the present invention;

FIG. 2 is a side elevation in section showing the appliance in combination with an artificial tooth form, shown in broken lines;

FIG. 3 is a top plan view;

FIG. 4 is a front elevation;

FIGS. 5 and 6 are similar front elevations showing different forms of tooth facing positioning means;

FIG. 7 is a perspective view of an alternative form of appliance;

FIG. 8 is a side elevation in section thereof;

FIG. 9 is a top plan view thereof;

FIG. 10 is a front elevation thereof; and

FIG. 11 is a perspective view of another alternative form of appliance.

Referring now to the drawings, and particularly to FIGS. 1 through 4, the dental appliance for use in forming additions to artificial replacements for teeth is indicated generally at 10. The appliance comprises a generally elongated shank or stem 11, which functions as a handle and has a flat front face 12 against which the rear flat surface of a porcelain tooth facing 13 is adapted to abut. The top end of a matrix, i.e., shank or stem 11 supports a flat platform 14 which is enclosed on all but the front edge by a retaining ridge or wall 15. Although platform 14 is shown as semi-circular, it may be square or oblong or otherwise as desired, so long as one edge is straight so as to butt against the flat back surface of the tooth facing. The flat top surface of platform 14 and the flat front face 12 are disposed generally at right angles to one another.

Porcelain tooth facing 11 is commonly provided with a pair of projecting pins 16 extending from the flat rear surface. For stabilization a recess such as slot 17 (or a pair of holes) is provided in the front face 12 of the appliances Because pins 16 are sometimes disposed horizontally and sometimes vertically, slot 17 preferably has both a horizontal portion and an intersecting central vertical portion to provide maximum versatility for the appliance. When pin holes are provided instead of the slot, they are disposed horizontally for one form of facing (FIG. 5) and vertically (FIG. 6) for the other, or preferably both. As illustrated, the horizontal component of slot 17 is spaced from and generally parallel to the top surface of platform 14 to receive pins 16. This stabilizes the tooth facing and positions it such that the rear bottom edge of the top face 18 of tooth facing 13 generally abuts the top front edge of platform 14, as illustrated in FIG. 2.

With the tooth facing 13 engaging and held in the appliance 10 in this manner, the wet batter of porcelain or powdered porcelain is applied to the top of platform 14 and the top face surface 18 of the facing and built up and shaped into a form 19 of appropriate contour. Wall 15 functions to confine the material. The assembled composite structure is then placed in the furnace for drying and fusing of the built up form 19 into a permanent rigid structure bonded and securely united to the facing. In the course of fusion of the porcelain, the supporting appliance 10 is destroyed by heat.

The dental appliance, according to FIGS. 1 through 4, is desirably formed by molding and is composed of a material having strength and rigidity at ambient temperatures but susceptible to destruction by heat at or below the high temperature, about 2,000° F., at which porcelain fuses. Such materials include, for example, hard dental waxes, such as hard base plate wax, fusible alloys, such as alloys of bismuth and alloys of tin with one another or with lead, cadmium, zinc, etc.; readily combustible or otherwise thermally destructible synthetic plastic materials, such as polyethylene, nylon, cellulose nitrate, and the like. A non-fusible refractory material may be used which, though not totally destroyed by the heat, loses its strength and binding power such that it may be readily brushed off the completed tooth facing.

Normally the facing is inserted into the furnace on a bed of silex which functions as an absorbent to take up the molten wax or metal as the supporting appliance is destroyed in the process of baking the porcelain.

In FIGS. 7 to 10, there is shown a modified form of supporting appliance for a porcelain tooth facing similar in all material respects to that described in connection with FIGS. 1 through 4, except adapted to be formed from relatively thin sheet material, as by stamping. Since fusible alloys are ductile and malleable, this form of appliance is especially adapted to construction from metal sheeting, but may be formed from other heat destructible materials as well.

Some forms of artificial tooth facings are provided with a slot or recess in the rear flat surface for the purpose of permitting the facing to be engaged by a corresponding projection. For this form of tooth facing, a slightly modified form of supporting appliance is shown in FIG. 11 which, instead of a recessed slot 17 or holes for the purpose of receiving projecting pins 16 is provided on the front flat face 12B with a projecting rib 20 adapted to engage the recess in a tooth facing provided therewith.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A disintegratable dental appliance for temporarily holding an artificial porcelain tooth facing during building up of added porcelain conforming to the jaw of the patient, said appliance comprising:

A. a matrix having a flat face adapted to be engaged by the rear flat surface of a tooth facing, B. a flat platform at one end of said matrix, said platform and flat face having a common edge, C. a retaining barrier around said platform except said common edge,
D. means associated with said flat face engageable by the tooth facing for positioning the same,
E. said device being composed of a heat destructible material.

2. An appliance according to claim 1 further characterized in that the top surface of said platform and said flat face are disposed approximately at right angles to one another.

3. An appliance according to claim 1 further characterized in that said platform is provided with an upwardly extending vertical wall on its edges other than said common edge with the flat face.

4. An appliance according to claim further characterized in that said means for positioning the tooth facing is a slot in the flat face of the matrix having a horizontal component spaced from and parallel to said common edge with the platform.

5. An appliance according to claim 1 further characterized in that said means for positioning the tooth facing is a slot in the flat face of the matrix having a centrally disposed vertical component.

6. An appliance according to claim 1 further characterized in that said means for positioning the tooth facing is a pair of pin holes in the flat face of the matrix along a horizontal line spaced from and parallel to the common edge with the platform.

7. An appliance according to claim 1 further characterized in that said means for positioning the tooth facing is a pair of pin holes in the flat face of the matrix along a centrally disposed vertical line, the uppermost of said holes being spaced from the common edge with the platform.

8. An appliance according to claim 1 further characterized in that said means for positioning the tooth facing comprises a projection extending forward from the flat face of the matrix, said projection being centrally disposed and extending longitudinally generally perpendicular to the plane of the platform surface.

9. An appliance according to claim 1 further characterized in that the material of which the device is formed is strong and rigid at ambient temperatures but heat destructible at temperatures below the fusion temperature of porcelain.

10. An appliance according to claim 9 further characterized in that said material is destructible at temperatures below about 2,000° F.

11. An appliance according to claim 10 further characterized in that said material is selected from the class consisting of hard waxes, fusible metal alloys, synthetic plastic materials and non-fusible refractory materials.

* * * * *